United States Patent [19]

Tanaka

[11] Patent Number: 5,361,178
[45] Date of Patent: Nov. 1, 1994

[54] DIGITAL DATA RECORDING APPARATUS

[75] Inventor: Minoru Tanaka, Oume, Japan

[73] Assignee: Teac Corporation, Tokyo, Japan

[21] Appl. No.: 114,209

[22] Filed: Aug. 30, 1993

[30] Foreign Application Priority Data

Mar. 8, 1993 [JP] Japan .................................. 5-047000

[51] Int. Cl.⁵ .......................... G11B 15/14; G11B 5/09
[52] U.S. Cl. ......................................... 360/64; 360/51
[58] Field of Search ....................... 360/32, 48, 61, 64, 360/51, 26, 22, 23

[56] References Cited

U.S. PATENT DOCUMENTS

| | | | |
|---|---|---|---|
| 4,547,816 | 10/1985 | Sochor | 360/32 X |
| 4,549,227 | 10/1985 | Hashimoto et al. | 360/32 X |
| 4,807,060 | 2/1989 | Takahashi et al. | 360/72.2 |
| 5,063,453 | 11/1991 | Yoshimura et al. | 360/32 |
| 5,247,396 | 9/1993 | Nagai et al. | 360/8 X |

FOREIGN PATENT DOCUMENTS

| | | |
|---|---|---|
| 0146773 | 11/1984 | European Pat. Off. . |
| 62-154285 | 7/1987 | Japan . |
| 62-266787 | 11/1987 | Japan . |
| 1-149263 | 12/1989 | Japan . |
| 2251972A | 3/1989 | United Kingdom . |

OTHER PUBLICATIONS

Patent Abstracts of Japan vol. 10, No. 030 (P-426) 5 Feb. 1986 and JP-A-60 179 962 (Matsushita Denki Sangyo K.K.) 13 Sep. 1985.
Patent Abstract of Japan vol. 9, No. 253 (P-395)(1976) 11 Oct. 1985 and JP-A-60 103 560 (Sony K.K.) 7 Jun. 1985.
Patent Abstracts of Japan vol. 10, No. 41 (P-429)(2098) 18 Feb. 1986 and JP-A-60 187 973 (Sony K.K.) 25 Sep. 1985.

Primary Examiner—Donald Hajec
Assistant Examiner—Thien Minh Le
Attorney, Agent, or Firm—Michael N. Meller

[57] ABSTRACT

A digital data recording apparatus includes a plurality of encoders for subjecting digital signals to a prescribed signal processing so as to supply a plurality of digital data signals, a memory part for temporarily storing the plurality of digital data signals supplied from the plurality of encoders, a selection part responsive to a sequence of selecting signals for selecting one of the plurality of digital data signals output from the memory part in accordance with the sequence of selecting signals and for supplying a selected digital data signal to a recording amplifier, and a timing control part for supplying one of the selecting signals to the selection part in accordance with a prescribed time sequence when a recording head is brought in contact with a magnetic tape within a time period in which a rotary drum is rotated one revolution, and for allowing the plurality of digital data signals supplied from the plurality of encoders to be written to the memory part at a first frequency, and for allowing the plurality of the thus stored digital data signals to be read from the memory part at a second frequency higher than the first frequency, wherein the plurality of digital data signals are recorded in one of a plurality of tracks of the magnetic tape in accordance with the sequence of the selecting signals supplied from the timing control part to the selection part.

10 Claims, 7 Drawing Sheets

DIGITAL DATA RECORDING APPARATUS

BACKGROUND OF THE INVENTION (1) Field of the Invention

The present invention generally relates to a digital data recording apparatus, and more particularly to a digital data recording apparatus adapted for recording digital audio signals in different areas of a recording medium and for reproducing audio signals from the recording medium.

(2) Description of the Related Art

Recently, the recording of audio signals such as music sound in a recording medium such as a compact disk is made by using multitrack digital audio data recording technology. A multitrack digital audio tape recorder is desirable because it can record audio signals in a recording medium and can reproduce audio signals from the recording medium with no significant deterioration of sound quality if the dubbing is repeated. There is an increasing need for a compact, less expensive multitrack digital audio tape recorder for personal or home uses.

Conventional 16-track, 32-track, 48-track or 64-track digital audio tape recorders have been commonly used in recording studios or the like. It is necessary for the conventional recorders mentioned above to use a magnetic tape having a large width in which a plurality of tracks extending in parallel to the longitudinal direction of the tape are formed to record audio signals. For this reason, the above conventional recorders will become a large scale system and will be expensive. Also, in the above multitrack digital audio tape recorders, it is difficult to increase the speed of reading and writing audio signals from and to the magnetic tape.

In order to increase the speed of reading and writing, an improved multitrack digital data recording method has been proposed. In the improved recording method mentioned above, a plurality of tracks extending obliquely to the longitudinal direction of a magnetic tape are formed for a higher recording density and a speedier reading and writing. However, when the improved recording method is applied to a multitrack digital audio tape recorder, it is necessary to use a large-scale time base corrector for enabling a higher recording density on a recording medium. Thus, there is a problem in that the multitrack digital tape recorder using such a time base corrector will become bulky and expensive.

A conceivable method for constructing a less expensive, compact multitrack digital audio tape recorder is to make use of a mechanical deck of 8 mm video tape recorder (VTR) and an integrated signal processor of rotary digital audio tape recorder (RDAT). The 8 mm VTRs are widely prevailing in recent years since they are compact and of light weight. The mechanical deck of 8 mm VTR includes a rotary drum, a tape running system and a tape cassette loading/unloading mechanism. However, when the 8 mm VTR mechanical deck and the RDAT integrated signal processor are combined, there are four major difficulties which should be resolved: (1) tracking signal, (2) audio signal processing method, (3) tape format and (4) circuit size.

The four major difficulties mentioned above will be described in the following: (1) The automatic track finding (ATF) method of RDAT recorder is greatly dependent on the format of magnetic tape. However, the automatic track finding (ATF) signals of 8 mm VTR recorder are recorded as analog signals. (2) The RDAT integrated signal processor is designed to process two-channel digital audio signals. This signal processing method is different from the signal processing method of 8 mm VTR recorder. (3) In order to process multichannel digital audio signals by combining a plurality of RDAT integrated signal processors each of which is designed to process two-channel digital audio signals, it is necessary to add a large amount of redundant bits to the processed signals for error correction. Therefore, it is difficult to achieve a higher recording density on the recording medium. (4) The RDAT recorder is designed to record two-channel digital audio signals in a magnetic tape and the magnetic tape is wound on a rotary drum by 90 degrees. However, in a case of the 8 mm VTR recorder, it is necessary to record 8-channel video signals in a video tape, and the video tape is wound on a rotary drum by 226 degrees. Therefore, it is necessary to make use of a large-scale time base corrector, in order to resolve the problems when the 8 mm VTR mechanical deck and the RDAT integrated signal processor are combined.

Figure 1:
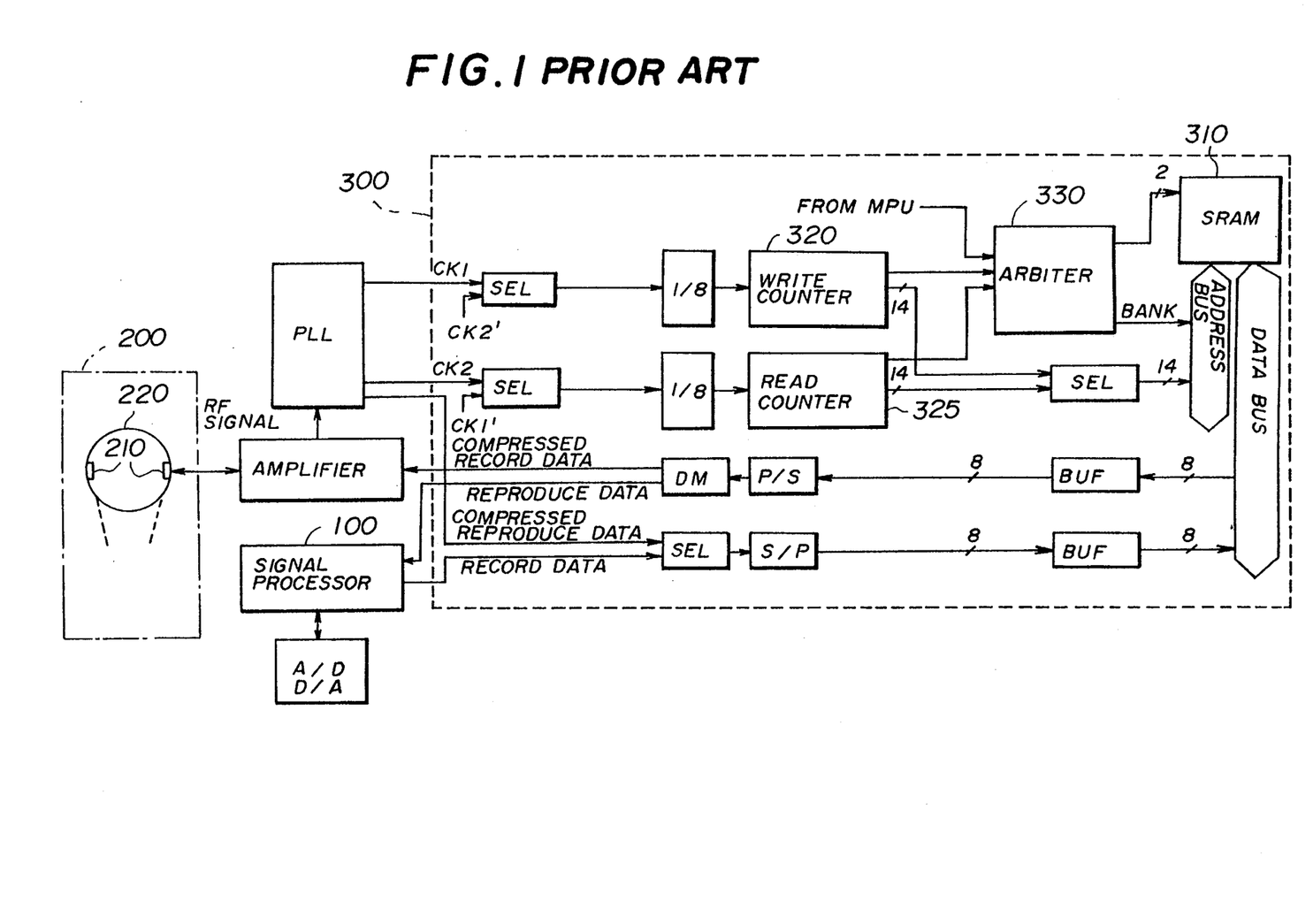
FIG. 1 is a block diagram showing a conventional multitrack digital audio tape recorder.

For example, FIG. 1 shows a conventional multitrack digital audio tape recorder using a known large-scale time base correcting circuit. In FIG. 1, there are shown an integrated signal processing circuit 100 of rotary digital audio tape recorder (RDAT), a mechanical deck 200 of 8 mm video tape recorder (VTR) including a rotary drum 220 with magnetic heads 210, and a time base corrector (TBC) 300.

In the time base corrector 300 shown in FIG. 1, a static random access memory (SRAM) 310, a writing counter 320, a reading counter 325, and an arbiter 330 are provided. The arbiter 330 functions to prevent the interference between the writing of information to the SRAM 310 and the reading of information from the SRAM 310. As shown in FIG. 1, the TBC 300 must be made up of various circuit components, and there is a problem in that the time base corrector provided in the multitrack digital audio tape recorder will be bulky and expensive.

SUMMARY OF THE INVENTION

Accordingly, it is a general object of the present invention to provide an improved digital data recording apparatus in which the above described problems are eliminated.

Another, more specific object of the present invention is to provide a digital data recording apparatus capable of efficiently recording digital audio signals in a plurality of tracks of a magnetic tape and efficiently reproducing the digital audio signals, which apparatus is compact and less expensive and is constructed by making use of a mechanical deck of 8 mm video tape recorder (VTR) and an integrated signal processing circuit of rotary digital audio tape recorder (RDAT).

The above mentioned objects of the present invention can be achieved by a digital data recording apparatus which includes a plurality of encoders for subjecting digital signals to a prescribed signal processing so as to supply a plurality of digital data signals, a memory part for temporarily storing the plurality of digital data signals supplied from the plurality of encoders, a selection part responsive to a sequence of selecting signals for selecting one of the plurality of digital data signals output from the memory part in accordance with the sequence of selecting signals and for supplying a selected digital data signal to a recording amplifier, and a timing control part for supplying one of the selecting signals to the selection part in accordance with a prescribed time sequence when a recording head is brought in contact with a magnetic tape within a time period for which a rotary drum is rotated one revolution, and for allowing the plurality of digital data signals supplied from the plurality of encoders to be written to the memory part at a first frequency, and for allowing the plurality of the thus stored digital data signals to be read from the memory part at a second frequency higher than the first frequency, wherein the plurality of digital data signals are recorded in one of a plurality of tracks of the magnetic tape in accordance with the sequence of the selecting signals supplied from the timing control part to the selection part.

According to the present invention, it is possible to provide a compact, less expensive multitrack digital audio tape recorder by making use of an 8 mm VTR mechanical deck and an RDAT integrated signal processing circuit. In the multitrack digital audio tape recorder according to the present invention, the plurality of digital data signals can be efficiently recorded in the magnetic tape and efficiently reproduced from the magnetic tape, and commonly used, less expensive integrated circuit chips can be adapted for the plurality of encoders and the memory part, and an existing general-purpose 8 mm VTR mechanical deck can be adapted for the rotary drum and the drive motor.

BRIEF DESCRIPTION OF THE DRAWINGS

The above and other objects, features and advantages of the present invention will become apparent from the following detailed description when read in conjunction with the accompanying drawings in which.

DESCRIPTION OF THE PREFERRED EMBODIMENT

Hereinafter, the digital data recording apparatus will be described as being a multitrack digital audio tape recorder in which digital audio signals which are compressed in terms of time axis are modulated and recorded by rotary heads independently in a plurality of tracks extending obliquely to the longitudinal direction of a recording medium such as a magnetic tape.

Figure 2A:
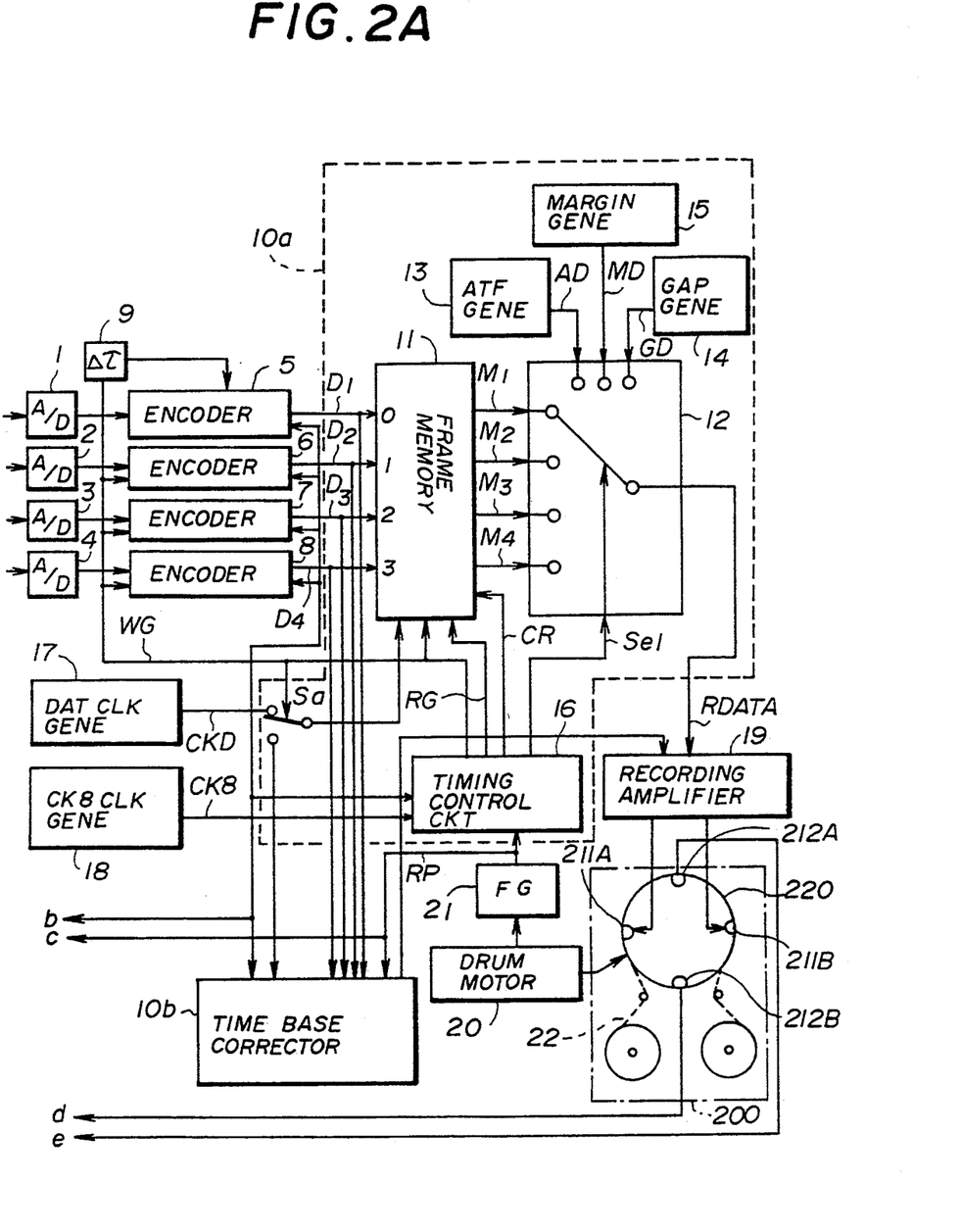
FIGS. 2A and 2B are block diagrams showing a recording unit and a reproducing unit of a digital data recording apparatus to which the present invention is applied.
Figure 2B:
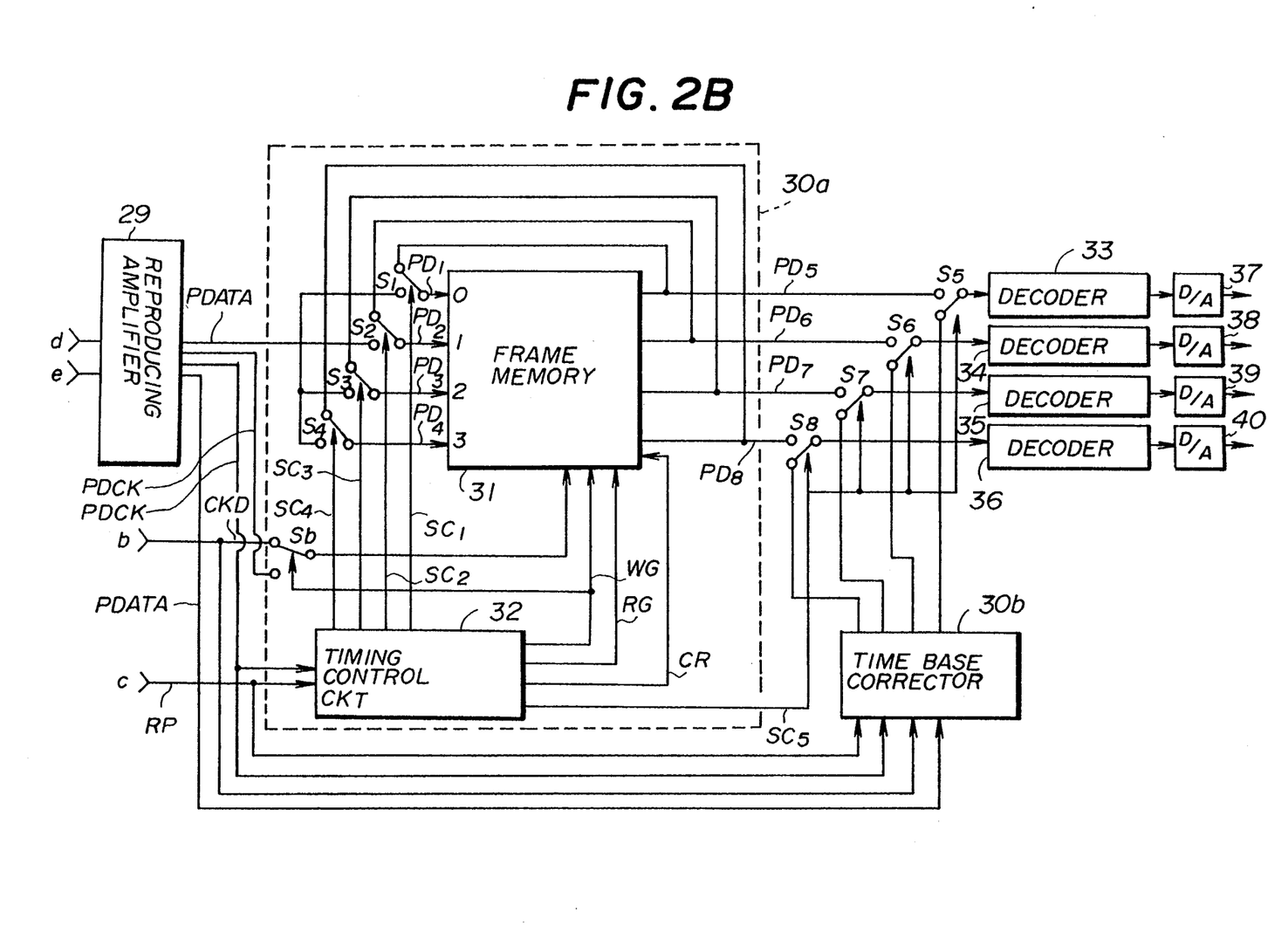

A description will be given of a preferred embodiment of the digital data recording apparatus according to the present invention, with reference to FIGS. 2A and 2B. FIG. 2A shows a recording unit of the digital data recording apparatus to which the present invention is applied. FIG. 2B shows a reproducing unit of the digital data recording apparatus. The recording unit in FIG. 2A and the reproducing unit in FIG. 2B are interconnected by signal lines "a" through "e" as shown.

In FIG. 2A, a mechanical deck 200 of 8 mm video tape recorder (VTR) is shown. The mechanical deck 200 includes a rotary drum 220 in which two recording heads 211A, 211B and two reproducing heads 212A, 212B are arranged around a rotating center of the rotary drum 220 such that the recording heads 211A and 211B are opposite to each other (the phases are 180 degrees different around the rotating center) and the reproducing heads 212A and 212B are opposite to each other (the phases are 180 degrees different around the rotating center).

The recording and reproducing heads are formed with stepped portions on the rotating surface of the rotary drum 220. As the rotary drum 220 rotates, one reproducing head traces a magnetic tape 22, in advance of one recording head, so as to reproduce audio signals from the magnetic tape 22, and the reproduced audio signals are subjected to a prescribed signal processing. Thus, an over-dubbing function of the 8 mm video tape recorder is achieved.

The magnetic tape 22 is wound on the rotary drum 220 by 226 degrees around its center, and it is arranged on the rotary drum 220 in a direction slanting to the length of the magnetic tape 22, so that the recording heads obliquely trace the magnetic tape 22 so as to form tracks extending obliquely to the longitudinal direction of the magnetic tape 20. In FIG. 2A, a recording amplifier 19 supplies recording current to each of the recording heads 211A and 211B while the magnetic tape 22 is running on the rotary drum 220 due to a tape running system (not shown) and the rotary drum 220 is rotated by the drum motor 22, so that the recording heads 211A and 211B record audio signals in tracks of the magnetic tape 22 in accordance with the recording current output from the recording amplifier 19.

In the recording unit shown in FIG. 2A, the incoming two-channel analog audio signals are respectively converted by four analog-to-digital (A/D) converters 1 through 4 into digital audio signals. These digital audio signals are supplied from the A/D converters 1–4 to four encoders 5–8, respectively.

Integrated signal processing circuits in conformance with the standard of rotary digital audio tape recorder (RDAT) are used as the encoders 5–8 shown in FIG. 2A. In the digital data recording apparatus of the present invention, an integrated signal processing circuit "HD 49226FS" manufactured by Hitachi Limited in Japan is adopted. The two-channel digital data signals are produced by the encoders 5–8, and redundant bits for error correction are added to these signals. The two-channel digital data signals are subjected to a prescribed signal processing and compressed in terms of time axis. In addition, automatic track finding (ATF) data for tracking servo as well as sub-code data indicating the absolute track addresses and the time codes are added to the compressed signals. Thus, the encoders 5–8 output four two-channel digital data signals D1–D4 which are in conformance with the standard of RDAT.

Figure 3:
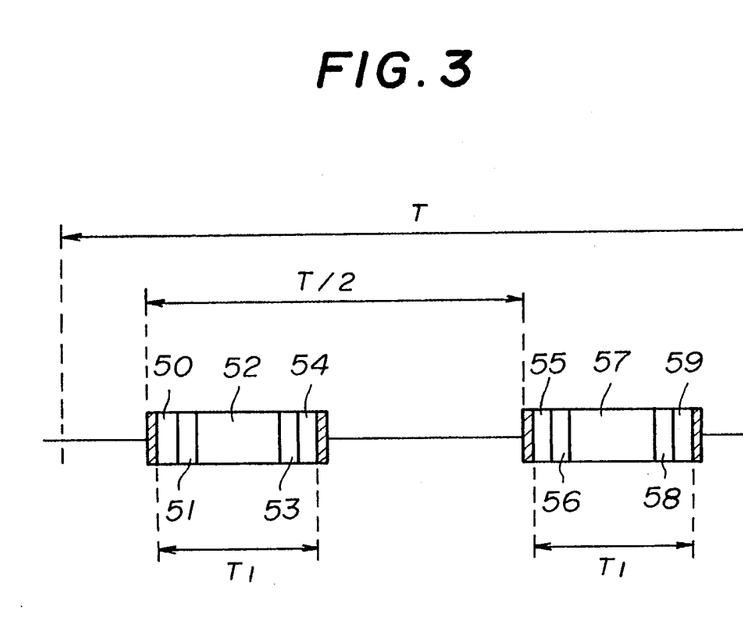
FIG. 3 is a timing chart showing an example of data format used by the digital data recording apparatus shown in FIGS. 2A and 2B.

FIG. 3 shows an example of data format used by the digital data recording apparatus shown in FIG. 2A. In FIG. 3, "T" denotes a time period for which the rotary drum 220 is rotated one revolution. In the digital data recording apparatus of the present invention, the time period T is set to 1/2000 min., used in the rotary digital audio tape recorder (RDAT). The two-channel digital data signal is recorded on the magnetic tape within a time period "T1" once for each time period "T/2" which is equal to half the time period "T". In FIG. 3, "T1" denotes the time period for which the rotary drum 22 is rotated 90 degrees or ¼ of one revolution.

In the data format shown in FIG. 3, PCM (pulse code modulation) audio data is indicated by reference numerals 52 and 57, the ATF data is indicated by reference numerals 51, 53, 56 and 58, and the sub-code data is indicated by reference numerals 50, 54, 55 and 59.

In FIG. 2A, the four two-channel digital audio data signals D1–D4 output from the encoders 5–8 are supplied to each of two time base correctors 10a and 10b. The two time base correctors 10a and 10b are of the same structure. In the time base correctors 10a and 10b, the data signals D1–D4 are temporarily stored in a memory, compressed in terms of time axis, and subjected to a prescribed track format generating process at 180-degree different phases for every time period T. One of the thus processed data signals is selected and supplied to the recording amplifier 19, and the recording current is supplied from the recording amplifier 19 to the recording heads 211A and 211B.

Next, a description will be given of the operation of the time base correctors provided in the digital data recording apparatus according to the present invention. For the sake of convenience, only the operation of the time base corrector 10a shown in FIG. 2A will be described.

In the time base corrector 10a shown in FIG. 2A, a frame memory 11, a multiplexer 12, an ATF generator 13, a GAP generator 14, a MARGIN generator 15, and a timing control circuit 16 are provided.

The frame memory 11 temporarily stores the four two-channel digital data signals D1–D4 supplied from the encoders 5–8, the data signals D1–D4 are in conformance with the standard of RDAT recorder. A known memory "HM 53051P" having a built-in address counter, manufactured by Hitachi Limited in Japan, which is normally used to store NTSC (National Television System Committee) television system signals, is adopted for the frame memory 11 of the digital data recording apparatus according to the present invention. The memory "HM 53051P" has four input terminals and four output terminals, and is capable of storing information arranged in 4 bits×262144 words. It is designed to allow random access to read or write data in terms of 4 bits×32 words.

Four two-channel digital data signals M1–M4 output by the frame memory 11, an ATF signal AD output by the ATF generator 13, a GAP signal GD output by the GAP generator 14, and a MARGIN signal MD output by the MARGIN generator 15 are supplied to the multiplexer 12.

The GAP signal GD indicates gap data having a given value and is recorded to prevent the interference between different channels. The MARGIN signal MD indicates margin data recorded on magnetic tape to indicate an edge of track. The ATF signal AD is ATF data recorded on magnetic tape for automatic track finding.

In the time base corrector 10a shown in FIG. 2A, a selecting signal SEL is supplied from the timing control circuit 16 to the multiplexer 12. The timing control circuit 16 is made up of logic circuit elements. In accordance with the selecting signal SEL supplied from the timing control circuit 16, one of the above described data signals (the four data signals M1–M4, the ATF signal AD, the GAP signal GD and the MARGIN signal MD) is selected, and the selected data signal is output by the multiplexer 12. Thus, a recording data signal RDATA (or the selected data signal) is supplied from the multiplexer 12 to the recording amplifier 19.

Figure 4:
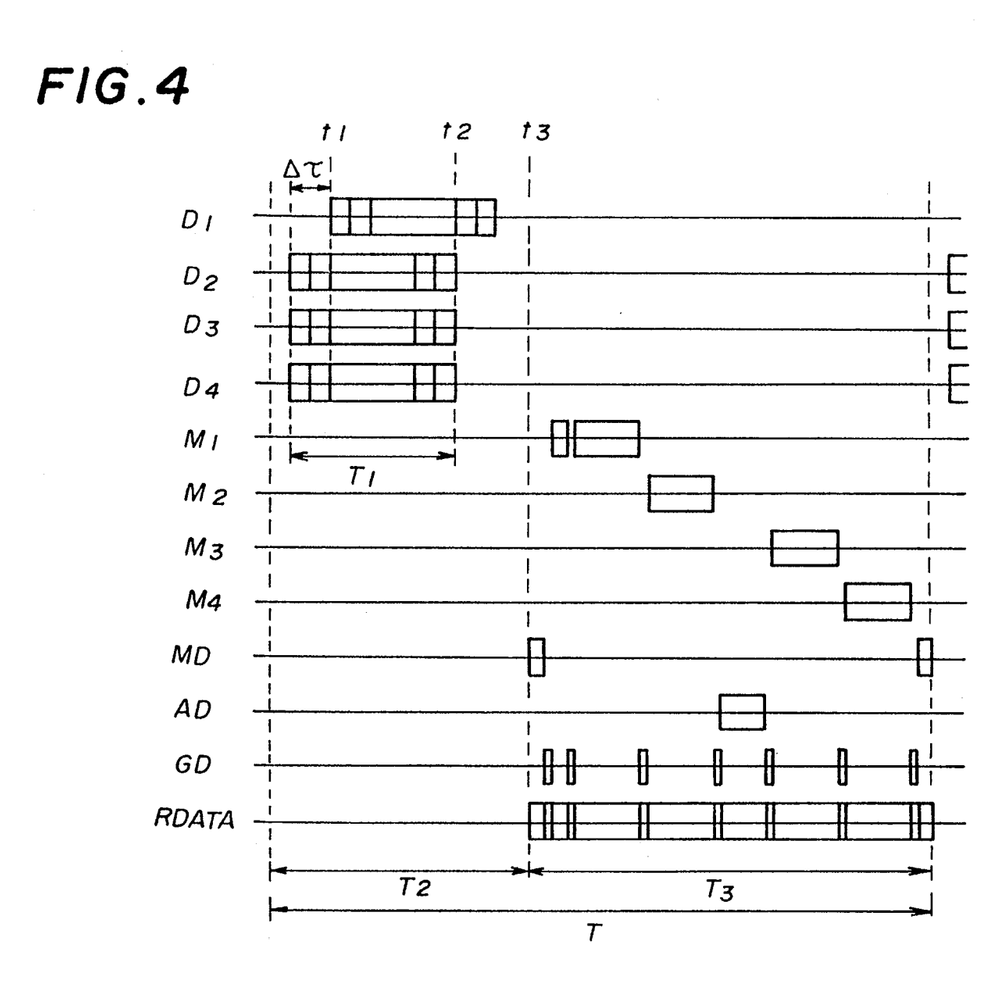
FIG. 4 is a timing chart for explaining the operation of the digital data recording apparatus when the recording mode is selected.

Next, a description will be given, with reference to FIGS. 2A and 4, of the operation of the digital data recording apparatus when the recording mode is selected. In FIG. 4, data signals which are the same as corresponding data signals shown in FIG. 2A are designated by the same reference characters and numerals.

In FIG. 4, the time period T corresponding to one revolution of the rotary drum 220 around its center is divided into two time intervals T2 and T3. The time interval T2 denotes a time during which the recording head is separate from or not in contact with the magnetic tape, and the time interval T3 denotes a time during which the recording head is brought in contact with the magnetic tape so as to record data signals in the magnetic tape. The time interval T3 corresponds to the time for the rotary drum 220 to be rotated by 220 degrees, and the ratio of the time interval T2 to the time interval T3 is equal to 140/220 (=T2/T3).

In the recording unit shown in FIG. 2A, a DAT clock generator 17 supplies a DAT clock signal CKD to each of the encoders 5–8 at a frequency of 9.408 MHz. The timing control circuit 16 supplies a writing gate signal WG to each of the encoders 5–8. After the writing gate signal WG is input to the encoders 6–8, the encoders 6–8 respectively output the compressed digital data D2–D4 to the frame memory 11 at a speed based on the DAT clock signal CKD. Since the writing gate signal WG is supplied to the encoder 5 through a delay circuit 9, only the encoder 5 outputs the compressed digital data D1 to the frame memory 11 at a time which is delayed by a time difference "Δτ" from the outputting of the data D2–D4 by the encoders 6–8. FIG. 4 shows the timings of outputting of the digital data D1–D4 from the encoders 5–8 to the frame memory 11.

In the recording unit shown in FIG. 2A, an 8 mm VTR clock generator 18 generates an clock signal CK8 at a frequency of 12.608 MHz. The clock signal CK8 supplied from the 8 mm VTR clock generator 18 and the clock signal CKD supplied from the DAT clock generator 17 are input to a clock selecting switch Sa. Also, the writing clock signal WG is supplied from the timing control circuit 16 to the clock selecting switch Sa. A switching operation of the clock selecting switch Sa is controlled in accordance with the writing gate signal WG from the timing control circuit 16. When digital data is written to the frame memory 11, the clock signal CKD is selected at the clock selecting switch Sa and it is supplied to the frame memory 11. On the other hand, when no digital data is written to the frame memory 11, the clock signal CK8 is selected at the clock selecting switch Sa and the clock signal CK8 is supplied to the frame memory 11.

The writing gate signal WG, a reading gate signal RG and a counter reset signal CR are supplied by the timing control circuit 16 to the frame memory 11. As the writing gate signal WG is input to the frame memory 11 at a time "t1" indicated in FIG. 4, the storing of the digital data D1–D4 in the frame memory 11 is started. As the inputting of the writing gate signal WG to the frame memory 11 is interrupted at a time "t2" indicated in FIG. 4, the storing of the digital data D1–D4 in the frame memory 11 is completed.

Accordingly, the leading-edge sub-code data, the leading-edge ATF data and the PCM audio data in the digital data D1 are written to or stored in the frame memory 11, while the PCM audio data, the rear-edge ATF data and the rear-edge sub-code data in each of the digital data D2–D4 are written thereto. The speed of writing of the above mentioned data to the frame memory 11 is in accordance with the clock signal CKD supplied from the DAT clock generator 17 via the clock selecting switch Sa.

In the recording unit shown in FIG. 2A, a frequency generator (FG) 21 connected to the drum motor 20 supplies a detection signal RP to the timing control circuit 16 when a prescribed rotational phase of the drum motor 20 is reached. Thus, based on the detection signal RP supplied from the FG 21, the timing control circuit 16 can detect the time when the recording head 211A (or 211B) of the rotary drum 220 is brought in contact with the magnetic tape 22.

As the recording head 211A (or 211B) is brought in contact with the magnetic tape 22 at a time "t3" indicated in FIG. 4, the multiplexer 12 selects within the time period T3 one of the data signals (the four data signals M1–M4 from the frame memory 11, the ATF signal AD from the ATF generator 13, the GAP signal GD from the GAP generator 14, and the MARGIN signal MD from the MARGIN generator 15), in accordance with the selecting signal SEL supplied from the timing control circuit 16. The selected data signal RDATA is output from the multiplexer 12 to the recording amplifier 19.

On the other hand, as the reading gate signal RG supplied from the timing control circuit 16 and the clock signal CK8 supplied from the 8 mm VTR clock generator 18 via the switch Sa are input to the frame memory 11, the four digital data signals M1–M4 are read out from the frame memory 11 at a speed based on the clock signal CK8. As previously described, the frequency of the clock signal CK8 used to read out digital data from the frame memory 11 is higher than the frequency of the clock signal CKD used to write digital data to the frame memory 11. The digital data M1–M4 read out from the frame memory 11 is produced by further compressing the digital data D1–D4 written to the frame memory 11. The compression ratio of this example is equal to 1/1.34.

As the counter reset signal CR supplied from the timing control circuit 16 is input to the frame memory 11, the addresses of the rear-edge ATF data and sub-code data contained in the digital data D2–D4 are reset, so that such data is discarded when the subsequent reading operation is performed. Only the required digital data is supplied to the multiplexer 12.

Therefore, as shown in FIG. 4, the MARGIN signal MD, the GAP signal GD, the sub-code data signal (M1), the GAP signal GD, the PCM audio data (M1), the GAP signal GD, the PCM audio data (M2), the GAP signal GD, the ATF signal AD, the GAP signal GD, the PCM audio data (M3), the GAP signal GD, the PCM audio data (M4), the GAP signal GD, and the MARGIN signal MD are selectively output by the multiplexer 12 in this order to the recording amplifier 19, so as to form the recording data RDATA.

Figure 5:
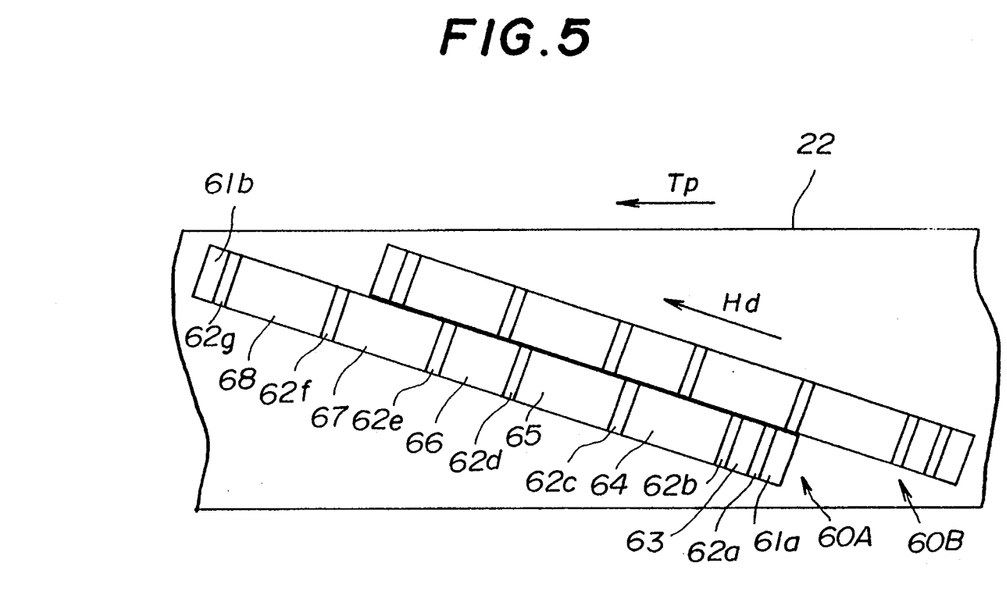
FIG. 5 is a diagram showing an example of tape format used by the digital data recording apparatus.

An operation which is similar to the above described operation carried out by means of the time base corrector 10a is carried out by means of the time base corrector 10b at a time that is delayed or retarded by a time corresponding to 180-degree phase difference within the time period T. As a result, a plurality of digital data is recorded in one track of the magnetic tape 22, and the recorded digital data is arranged in the tape format shown in FIG. 5. The digital data is alternately recorded in two tracks of the magnetic tape by a known azimuth duplicating writing process. As shown in FIG. 5, the tracks of the magnetic tape 22 extend obliquely to the longitudinal direction of the magnetic tape 22 in order for a higher recording density.

In FIG. 5, the magnetic tape 22 runs in a direction indicated by the arrow "Tp", the recording heads 211A and 211B obliquely trace the magnetic tape 22 in a direction indicated by the arrow "Hd" when the rotary drum 220 is rotated. A track in which a plurality of digital data is recorded by the recording head 211A is indicated by reference numeral 60A in FIG. 5, and a track in which a plurality of digital data is recorded by the recording head 211B is indicated by reference numeral 60B.

In the track 60A shown in FIG. 5, there are various data areas in which different digital data is recorded. MARGIN data areas 61b and 61a are respectively formed at the leading edge of the track 60A and at the rear edge thereof, which are located near the upper edge of the magnetic tape 22 and the lower edge thereof. An ATF data area 66 inserted between two gap data areas 62d and 62e is formed in the middle of the track 60A. A sub-code data area 63 inserted between two gap data areas 62a and 62b is formed at a location for every track. Four PCM audio data areas 64, 65, 67 and 68 each of which contains half of the two-channel PCM audio data are interleaved between two gap data areas in the track 60A. A total of four two-channel PCM audio data (amounting to eight channels of PCM audio data) is recorded in the two tracks 60A and 60B.

Figure 6:
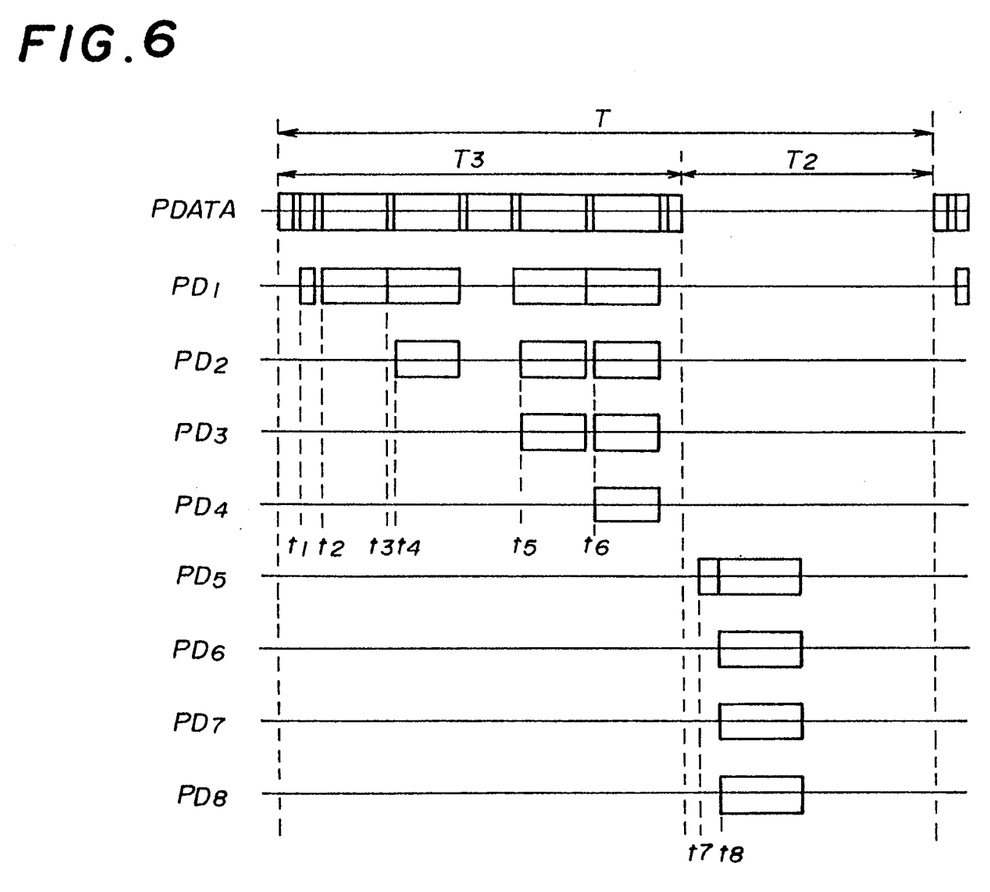
FIG. 6 is a timing chart for explaining the operation of the digital data recording apparatus when the reproducing mode is selected.

Next, a description will be given, with reference to FIGS. 2B and 6, of the operation of the digital data recording apparatus when the reproducing mode is selected. In FIG. 6, data signals which are the same as corresponding data signals in FIG. 2B are designated by the same reference numerals or characters.

In FIG. 6, the time period T corresponding to one revolution of the rotary drum 220 around its center is divided into two time intervals T2 and T3. The time interval T2 denotes a time during which the reproducing head 212A (or 212B) is separated from or not in contact with the magnetic tape 22, and the time interval T3 denotes a time during which the reproducing head 212A (or 212B) is brought in contact with the magnetic tape 22 so as to reproduce audio signals from the magnetic tape 22.

In the reproducing unit shown in FIG. 2B, four integrated circuit chips "HD 49226FS" manufactured by Hitachi Limited in Japan are adopted for four decoders 33–36. Each integrated circuit chip includes an encoder and a decoder, and the encoders 5–8 and the decoders 33–36 are included in the four integrated circuit chips.

In FIG. 2B, reproducing signals PDATA supplied from the reproducing heads 212A and 212B shown in FIG. 2A are respectively input to two time base correctors 30a and 30b through a reproducing amplifier 29 at 180-degree different phases within the time period T. The two time base correctors 30a and 30b are of the same structure. For the sake of convenience, only the operation of the time base corrector 30a will now be described.

In the time base corrector 30a shown in FIG. 2B, the known memory "HM 53051P" from Hitachi Limited is used as a frame memory 31. Thus, the frame memory 31 is of the type which is the same as the type of the frame memory 11 in FIG. 2A. A timing control circuit 32 is made up of logic circuit elements, and supplies a writing gate signal WG, a reading gate signal RG and a counter reset signal CR to the frame memory 31. The clock signal CKD supplied from the DAT clock generator 17 (FIG. 2A) and a sync clock signal PDCK supplied from the reproducing amplifier 29 are input to a clock selecting switch Sb, and one of the two clock signals is selected by the clock selecting switch Sb and supplied to the frame memory 31. A known phase locked loop PLL circuit (not shown in FIG. 2B) is built in the reproducing amplifier 29, and the sync clock signal PDCK mentioned above is supplied from this PLL circuit. In accordance with the three timing signals WG, RG and CR and the selected clock signal input to the frame memory 31, the writing and reading of digital data to and from the frame memory 31 are controlled. A reproducing data PDATA output from the reproducing amplifier 29 is written to the frame memory 31 in synchronism with the sync clock signal PDATA.

The reproducing data PDATA output from the reproducing amplifier 29 is input to four switches S1–S4. The timing control circuit 32 supplies four switching signals SC1–SC4 to the switches S1–S4, respectively, so that the switches S1–S4 are turned on and off in accordance with the switching signals SC1–SC4 supplied from the timing control circuit 32. Thus, reproducing data signals PD1–PD4 are supplied to the frame memory 31 in synchronism with the switching signals S1–S4 supplied from the timing control circuit 32.

When the sub-code data in the first data signal PD1 appears at the switch S1 at a time t1 indicated in FIG. 6, the switch S1 is turned on in accordance with the switching signal SC1, so that the reproducing data signal PDATA from the reproducing amplifier 29 is supplied to an input terminal "0" of the frame memory 31. At this time, the switches S2–S4 are turned off in accordance with the switching signals SC2–SC4, and input terminals "1"–"3" of the frame memory 31 are connected to corresponding output terminals thereof. After reading and writing address pointers of the frame memory 31 are reset, the writing gate signal WG is supplied from the timing control circuit 32 to the frame memory 31 so that the sub-code data in the data signal PD1 is written to the frame memory 31.

As the reading address pointers are incremented, previously stored data are respectively supplied from the corresponding output terminals of the frame memory 31 to the input terminals "1"–"3" thereof. As the writing address pointer is incremented, the writing gate signal WG is output to the frame memory 31 and then the sub-code data in the reproducing data signal PD1 is stored in the frame memory 31. Within a time period t1–t2 indicated in FIG. 6, the sub-code data in the data signal PD1 is supplied to the input terminal "0" of the frame memory 31 while the previously stored data are supplied to the input terminals "1"–"3" of the frame memory 31.

For a time period t2–t3 indicated in FIG. 6, the PCM audio data in the data signal PD1 is stored in the frame memory 31 in a manner described above. At a time t3 indicated in FIG. 6, the switch S1 is turned off in accordance with the switching signal SC1, so that the previously stored sub-code data and PCM audio data in the data signal PD1 are supplied to the input terminal "0" of the frame memory 31 so as to store the supplied data.

At a time t4 indicated in FIG. 6, the switch S2 is turned on in accordance with the switching signal SC2, so that the PCM audio data in the data signal PD2 is supplied to the input terminal "1" of the frame memory 31. At this time, the other switches are off so that corresponding output terminals of the frame memory 31 are connected to the input terminals thereof.

After the PCM audio data in the data signal PD2 is stored in the frame memory 31, the PCM audio data in the data signal PD3 appears at the switch S3 at a time t5 indicated in FIG. 6. At this time, the switch S3 is turned on in a manner described above, so that the PCM audio data in the data signal PD3 is supplied to the input terminal "2" of the frame memory 31. The other switches are turned off so that corresponding output terminals of the frame memory 31 are connected to the input terminals thereof.

After the PCM audio data in the data signal PD3 is stored in the frame memory 31, the PCM audio data in the data signal PD4 appears at the switch S4 at a time t6 indicated in FIG. 6. At this time, the switch S4 is turned on in a manner described above, so that the PCM audio data in the data signal PD4 is supplied to the input terminal "3" of the frame memory 31. The other switches are turned off so that corresponding output terminals of the frame memory 31 are connected to the input terminals thereof.

Within the time interval T3 indicated in FIG. 6 (during which the reproducing head 212A is brought in contact with the magnetic tape 22), the sub-code data and PCM audio data in each of the data signals PD1–PD4 of the reproducing data PDATA are stored in the frame memory 31. The speed of writing of the reproducing data to the frame memory 31 is based on the sync clock signal PDCK supplied from the reproducing amplifier 29.

Within the time interval T2 indicated in FIG. 6 (during which the reproducing head 212A is separate from the magnetic tape), the stored data signals are read from the frame memory 31 at the speed based on the clock signal CKD supplied from the DAT clock generator 17. Thus, the stored digital data of the frame memory 31 are decompressed in terms of time axis by the ratio of 1.34/1 so as to produce digital data PD5–PD8 from the output terminals of the frame memory 31.

At a time t7 indicated in FIG. 6, the sub-code data in the data signal PD5 is read out from the frame memory 31. At a time t8 indicated in FIG. 6, the PCM audio data of all the data signals PD5–PD8 are read out at a time from the frame memory 31.

An operation which is similar to the above described operation carried out by the time base corrector 30a is carried out by the time base corrector 30b at a time which is delayed by a time corresponding to a 180-degree phase difference within the time period T.

In the reproducing unit shown in FIG. 2B, the frame memory 31 is connected to the decoders 33–36 through switches S5–S8, and the timing control circuit 32 supplies a switching signal SC5 to each of the switches S5–S8 so that the switches S5–S8 are turned on and off in accordance with the switching signal SC5 supplied from the timing control circuit 32. As a result, the digital data supplied from the time base corrector 30a and the digital data supplied from the time base corrector 30b are alternately supplied to the decoders 33–36 at 180-degree different time phases within the time period T. The thus supplied digital data signals are decoded by the decoders 33–36 so as to produce the reconstructed digital data, and such digital data signals are supplied to four digital-to-analog (D/A) converters 37-40. The digital data signals are converted by the D/A converters 37-40 into analog signals so that 8-channel analog audio signals are produced.

As described above, according to the present invention, the writing of digital data to the frame memory and the reading of digital data from the frame memory are separately carried out in a unique manner, and it is possible to provide a digital data recording apparatus utilizing a time base corrector which is smaller in size and less expensive than the known time base corrector of the conventional digital data recording apparatus.

In the above described embodiment, the reading of digital audio data from the frame memory is controlled in a unique manner, and unnecessary data is eliminated from data output from the encoders, made of the existing integrated circuits. It is possible to realize a higher recording density of the digital data recording apparatus.

In the above described embodiment, previously stored digital data from an output terminal of the frame memory is again supplied to a corresponding input terminal of the frame memory. It is possible to realize the writing of one bit of digital data to the frame memory even when an existing memory for storing NTSC television system signals is adapted for the frame memory. Therefore, according to the present invention, it is possible to provide a compact, less expensive digital data recording apparatus by making use of the 8 mm VTR mechanical deck and the RDAT integrated signal processing circuit.

In the above described embodiment, the encoders 5-8 supplies the compressed digital data, which is in conformance with the RDAT standard, to the frame memory within a time period for which the rotary drum is rotated 90 degrees. During this time period, one recording head of the rotary drum is brought in contact with the magnetic tape, the other recording head is separate from the magnetic tape. However, the digital data recording apparatus described above cannot be realized when an 8 mm VTR mechanical deck in which the magnetic tape is wound on the rotary drum over 270 degrees around its center is utilized. A conceivable method to eliminate the above described problem is to utilize two frame memories in the recording unit of the digital data recording apparatus. In such a modified recording unit, the digital data supplied from the encoders 5-8 are twice compressed in terms of time axis by means of the two frame memories.

In addition, a known microcomputer having a memory and input-and-output (I/O) bus lines can be adopted for the digital data recording apparatus of the present invention. In such a modified digital data recording apparatus, digital data output from the encoders 5-8 are supplied to the I/O bus lines of the microcomputer so that the digital data is temporarily stored in the memory. A known bit masking method is utilized to read out the digital data of each channel from the memory. Similarly, when the reproducing mode is selected, the known bit masking method is utilized. An ORing operation between the stored data at locations of the memory where the reproducing data is to be written and the reproducing data output from the reproducing heads is performed, and the result of the ORing is utilized such that the reproducing data of channels 1-4 output from the reproducing heads are sequentially written to the memory.

Further, the present invention is not limited to the above described embodiment, and variations and modifications may be made without departing from the scope of the present invention.

What is claimed is:

1. An apparatus for recording digital audio signals in different areas of a magnetic tape and for reproducing the digital audio signals from the magnetic tape, said apparatus comprising:

a recording head for recording digital audio signals in a magnetic tape;

a recording amplifier for supplying recording signals to said recording head so that digital audio signals are recorded in the magnetic tape in accordance with the recording signals;

a rotary drum on which the magnetic tape is running in contact with the rotary drum within a prescribed range of rotational angle around a rotating center of the rotary drum;

a drive motor for rotating said rotary drum around the rotating center such that digital audio signals are recorded by said recording head in a plurality of tracks of the magnetic tape when said rotary drum is rotated, said tracks extending obliquely to a longitudinal direction of the magnetic tape;

a plurality of encoding means for subjecting digital signals to a prescribed signal processing operation for compressing the digital signals, and for outputting a plurality of digital data signals corresponding to the compressed digital signals, in response to a writing gate signal;

memory means for temporarily storing the plurality of digital data signals supplied from said plurality of encoding means, said memory means being responsive to a writing gate signal to store the plurality of digital data signals from said encoding means and being responsive to a reading gate signal to output the plurality of the stored digital data signals;

selection means responsive to a sequence of selecting signals for selectively outputting the plurality of digital data signals supplied from said memory means to said recording amplifier in accordance with the sequence of selecting signals, so that the digital audio signals are recorded in one of the plurality of tracks of the magnetic tape by the recording head; and timing control means for supplying the writing gate signal to said encoding means and to said memory means within a first portion of a time period of one revolution of the rotary drum during which the recording head is not in contact with the magnetic tape, so that the plurality of digital data signals from said encoding means is stored in said memory means at a first frequency, and for supplying the reading gate signal to said memory means and simultaneously supplying the respective selecting signals to said selection means within a second portion of the time period of one revolution of the rotary drum during which the recording head is brought in contact with the magnetic tape, so that the plurality of the stored digital data signals from said memory means is output to said selection means at a second, higher frequency and simultaneously said digital data signals of said selection means are selectively supplied to said recording amplifier in accordance with the sequence of the selecting signals.

2. An apparatus according to claim 1, wherein said timing control means comprises a frequency generator for supplying a detection signal indicating when the recording head is brought in contact with the magnetic tape within a time period in which the rotary drum is rotated one revolution, to said timing control means, so that it is detected whether or not the recording head is in contact with the magnetic tape based on the detection signal.

3. An apparatus according to claim 1, wherein said plurality of encoding means are four encoders each of which subjects two-channel digital signals to the prescribed signal processing and supplies the thus processed two-channel digital signals to an input terminal of said memory means.

4. An apparatus according to claim 1, wherein said apparatus is made up of two time base correctors each of which comprises said memory means, said selection means, and said timing control means.

5. An apparatus according to claim 1, wherein said memory means is a frame memory having four input terminals connected to said encoding means and four output terminals connected to said selection means.

6. An apparatus according to claim 1, wherein said apparatus is made up of two recording heads arranged on the rotary drum at locations separated from each other by a rotational angle of 180 degrees around the rotating center of the rotary drum.

7. An apparatus according to claim 1, wherein said apparatus is made up of two time base correctors for compressing digital data signals in terms of time axis and two time base correctors for decompressing digital data signals in terms of time axis.

8. An apparatus according to claim 1, further comprising means for supplying an automatic track finding control signal to said selection means, said selection means being responsive to a selecting signal from said timing control means to output the automatic track finding control signal to said recording amplifier so that one of the plurality of tracks of the magnetic tape is selected for the recording head.

9. An apparatus according to claim 1, wherein said timing control means comprises:
   first clock means for outputting a first clock signal to each of the plurality of encoding means at the first frequency, and for outputting the first clock signal to said memory means via a selecting switch at the first frequency; and
   second clock means for outputting a second clock signal to said memory means via said selecting switch at the second frequency.

10. An apparatus according to claim 9, wherein said timing control means further comprises:
   means for supplying a writing gate signal to the selecting switch, so that the selecting switch is turned on and off in accordance with the writing gate signal supplied from said means,
   wherein said first clock signal output from the first clock means is supplied to the memory means via the selecting switch when the plurality of digital data signals are written to the memory means, and
   wherein said second clock signal output from the second clock means is supplied to the memory means via the selecting switch when no digital data signals are written to the memory means.

* * * * *